(12) United States Patent
Holst et al.

(10) Patent No.: US 6,644,740 B2
(45) Date of Patent: Nov. 11, 2003

(54) VEHICLE SEAT LUMBAR SUPPORT SYSTEM

(75) Inventors: Bert Holst, Åmål (SE); Dominic Ebefors, Trollhättan (SE)

(73) Assignee: Lear Corporation, Southfield, MI (US)

( * ) Notice: Subject to any disclaimer, the term of this patent is extended or adjusted under 35 U.S.C. 154(b) by 71 days.

(21) Appl. No.: 09/858,792

(22) Filed: May 16, 2001

(65) Prior Publication Data

US 2002/0008417 A1 Jan. 24, 2002

Related U.S. Application Data

(60) Provisional application No. 60/214,618, filed on Jun. 28, 2000.

(51) Int. Cl.⁷ .................................................. B60N 2/66
(52) U.S. Cl. ..................................................... 297/284.4
(58) Field of Search ........................... 297/284.1, 284.4

(56) References Cited

U.S. PATENT DOCUMENTS

| | | | |
|---|---|---|---|
| 4,565,406 A | * | 1/1986 | Suzuki ..................... 297/284.4 |
| 4,715,653 A | * | 12/1987 | Hattori et al. ........... 297/284.4 |
| 5,217,278 A | | 6/1993 | Harrison et al. |
| 5,505,520 A | | 4/1996 | Frusti et al. |
| 5,507,559 A | | 4/1996 | Lance |
| 5,609,394 A | | 3/1997 | Ligon, Sr. et al. |
| 5,685,606 A | | 11/1997 | Lance |
| 5,704,687 A | | 1/1998 | Klingler |
| 5,716,098 A | | 2/1998 | Lance |
| 5,769,490 A | | 6/1998 | Falzon |
| 5,788,328 A | | 8/1998 | Lance |
| 5,816,653 A | | 10/1998 | Benson |
| 5,823,620 A | | 10/1998 | Le Caz |
| 5,954,399 A | * | 9/1999 | Hong ....................... 297/284.4 |
| 6,050,641 A | | 4/2000 | Benson |
| 6,402,246 B1 | * | 6/2002 | Mundell .................. 297/284.4 |

\* cited by examiner

Primary Examiner—Peter R. Brown
(74) Attorney, Agent, or Firm—Bill C. Panagos

(57) ABSTRACT

A vehicle seat lumbar support adjustment device includes an actuator operatively connected to a cable which extends across the seatback. A compressible plastic support structure is positioned between the cable and a cushion layer, and movable toward the cushion layer by actuation of the cable in order to adjust lumbar support for a seat occupant. Preferably, the compressible plastic support structure includes an integrally molded spring component positioned between opposing walls of the support structure.

17 Claims, 10 Drawing Sheets

VEHICLE SEAT LUMBAR SUPPORT SYSTEM

CROSS-REFERENCE TO RELATED APPLICATION

This application claims the benefit of U.S. provisional application Ser. No. 60/214,618, filed Jun. 28, 2000.

BACKGROUND OF THE INVENTION

1. Field of the Invention

The present invention relates to a vehicle seat lumbar support system including a compressible plastic support structure which includes an integrally molded spring, and a cable operative to adjust the compressed position of the plastic support structure against a lower seatback cushion for lumbar adjustment.

2. Background Art

For ergonomic and therapeutic reasons, it is desirable to provide adjustable support to the lower lumbar region of a person's back when seated for long periods of time. As automobile driving often entails long-seated periods with only limited movement, lumbar support mechanisms are a welcome addition to many automobile seat assemblies. The lumbar support mechanisms must be adjustable in view of varying body sizes and shapes of automobile drivers and passengers, as well as the desire to alter one's seating conditions from time-to-time.

Adjustable lumbar support systems typically provide a mechanism or inflatable device located in the seatback adjacent to the lumbar region of the passenger's back. This allows the passenger to adjust the extent to which a lumbar support member protrudes from within the seatback. As a passenger begins to experience fatigue, adjusting the position of the lumbar support member can reduce fatigue and increase customer satisfaction.

The prior art has advanced many types of adjustable lumbar support mechanisms for the automobile seat environment, including both manually adjusted and power adjusted units. A wide variety of such systems are available. These systems often suffer from one or more problems, such as complexity of construction and consequent expense. Less complicated and less expensive systems may be less effective in operation.

While nearly all prior art lumbar support mechanisms function satisfactorily, there remains the ever-present desire to further reduce both cost and weight, while maintaining and/or increasing durability, functionality, and assembly.

SUMMARY OF THE INVENTION

The present invention provides a vehicle seat lumbar support adjustment device which includes a compressible plastic support structure with an integrally molded spring.

More specifically, the present invention provides a vehicle seat lumbar support adjustment device including an actuator operatively connected to a cable which extends across a seatback. A compressible plastic support structure is positioned between the cable and a cushion layer, and movable toward the cushion layer by tensioning of the cable in order to adjust lumbar support for a seat occupant. Preferably, the compressible plastic support structure includes an integrally molded spring component positioned between opposing walls of the support structure.

The integrally molded spring component is formed by intersecting walls of the support structure. The intersecting walls cross over each other to form at least one generally X-shaped configuration when viewed in horizontal cross-section.

Another aspect of the invention provides a vehicle seat occupant protection system including a compressible plastic support structure positioned behind a cushion layer in a seatback. The plastic support structure includes an integrally molded spring component positioned between opposing walls of the support structure. The plastic support structure is sufficiently compressible to provide a catcher's mitt-type occupant protection system at low vehicle speeds wherein, upon rear impact, the occupant penetrates deeply into the seatback by compressing the plastic support structure during impact so that the occupant is retained in the seated position.

Accordingly, an object of the invention is to provide a vehicle seat lumbar support adjustment device including a flexible, compressible plastic support structure which is adjustably compressed against a cushion layer by an actuator-adjusted cable extending across the seatback.

Another object of the invention is to provide a lumbar support adjustment device in which cost and weight are reduced while maintaining and/or increasing durability, functionality and assembly.

The above objects and other objects, features, and advantages of the present invention are readily apparent from the following detailed description of the best modes for carrying out the invention when taken in connection with the accompanying drawings.

DETAILED DESCRIPTION OF THE PREFERRED EMBODIMENTS

Figure 1:
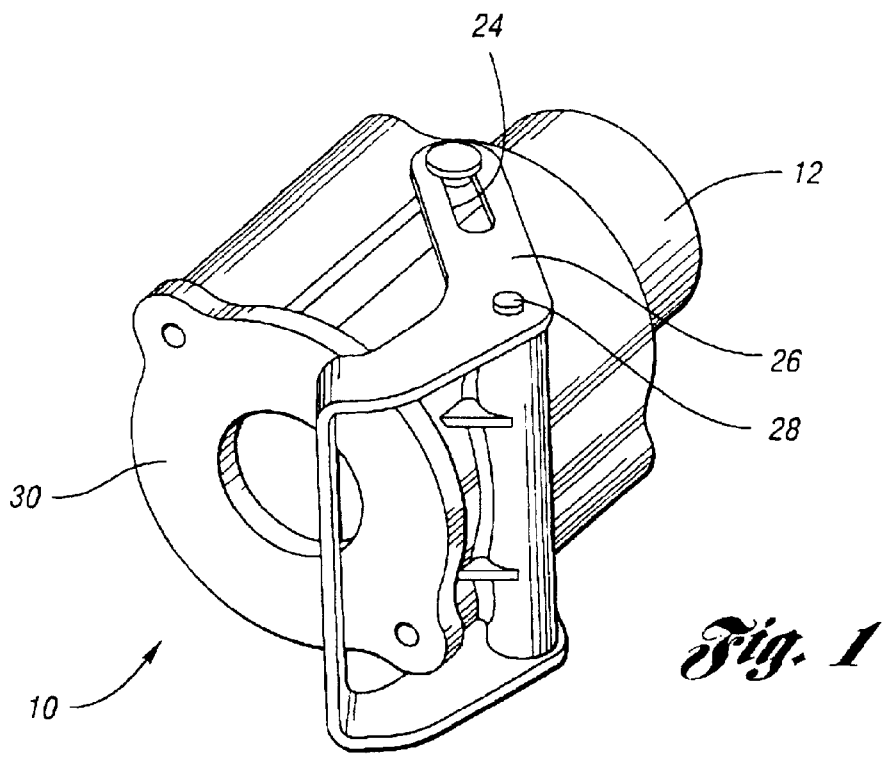
FIG. 1 shows a perspective view of a drive motor in accordance with the present invention.
Figure 2:
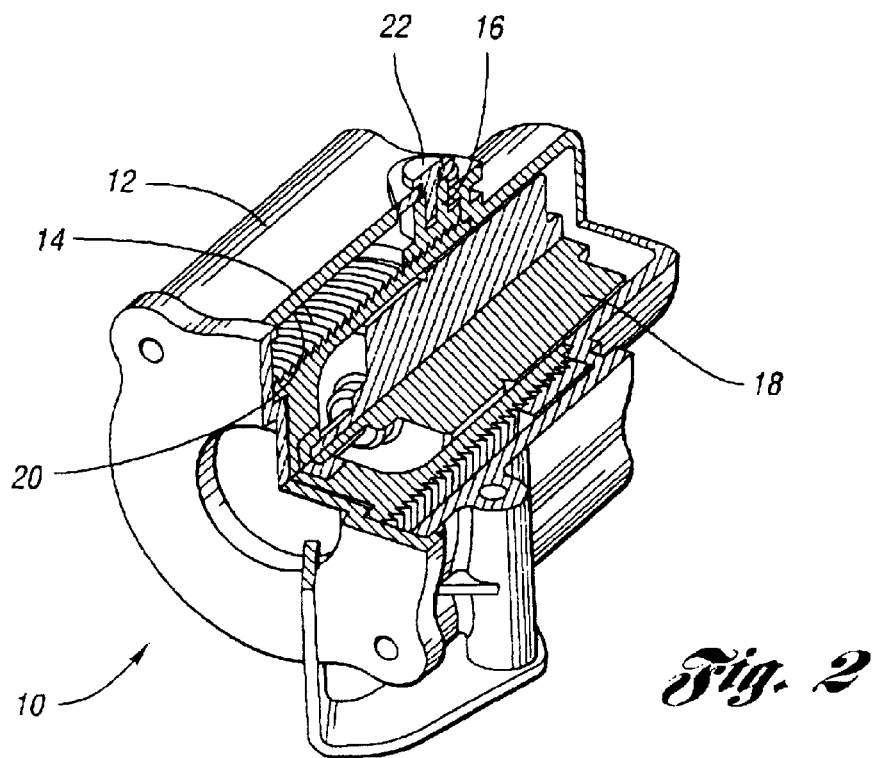
FIG. 2 shows a cut-away perspective view of the drive motor of FIG. 1.
Figure 3:
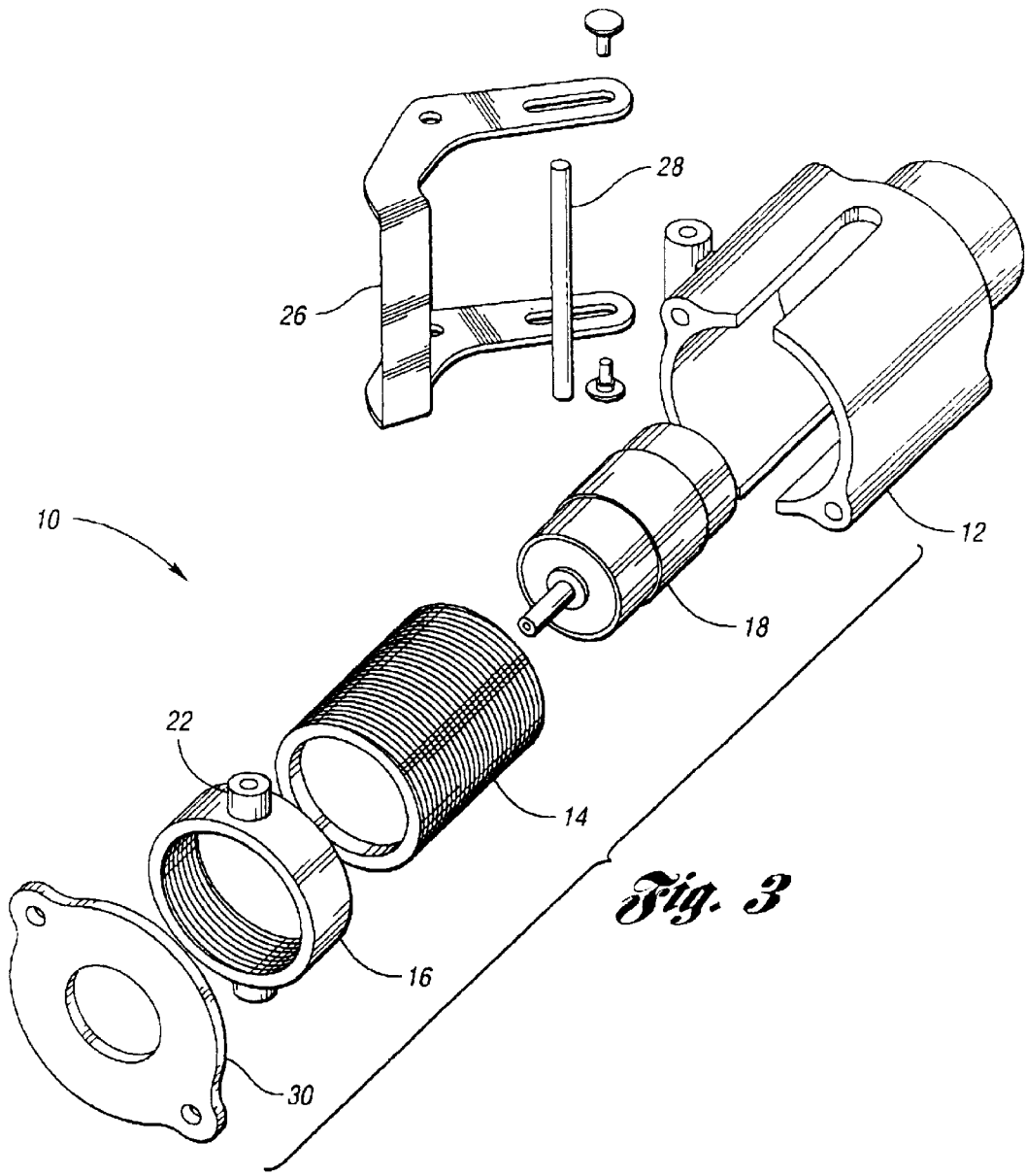
FIG. 3 shows an exploded perspective view of the drive motor of FIG. 1.

FIGS. 1–3 show a drive motor (or actuator) assembly for actuation of a lumbar support device in a vehicle seat assembly. In particular, this aspect of the present invention provides a very compact assembly by encapsulating a motor within a screw housing.

As shown in FIGS. 1 and 2, the lumbar drive mechanism (or actuator) 10 includes a housing 12 which encloses a rotatable drive screw 14 which is operatively associated with a movable nut 16. The movable nut 16 is internally threaded for engagement with the threads of the drive screw 14. A drive motor 18 is positioned within the drive screw 14 for rotatably driving the drive screw 14 to move the movable nut 16 along the internal cavity 20 formed by the housing 12.

The nut 16 includes a shoulder screw 22 which is operatively associated with a slot 24 of a pivotable brace 26. The pivotable brace 26 is operative to pivot about the pivot joint 28 when pivoted by the moving nut 16 to actuate a lumbar support mechanism. A lid 30 encloses the end of the housing 12.

This assembly is easy to fit and adapt to an existing seat back frame and is very compact, particularly because the motor 18 is encapsulated within the screw 14 within the housing 12.

Figure 4:
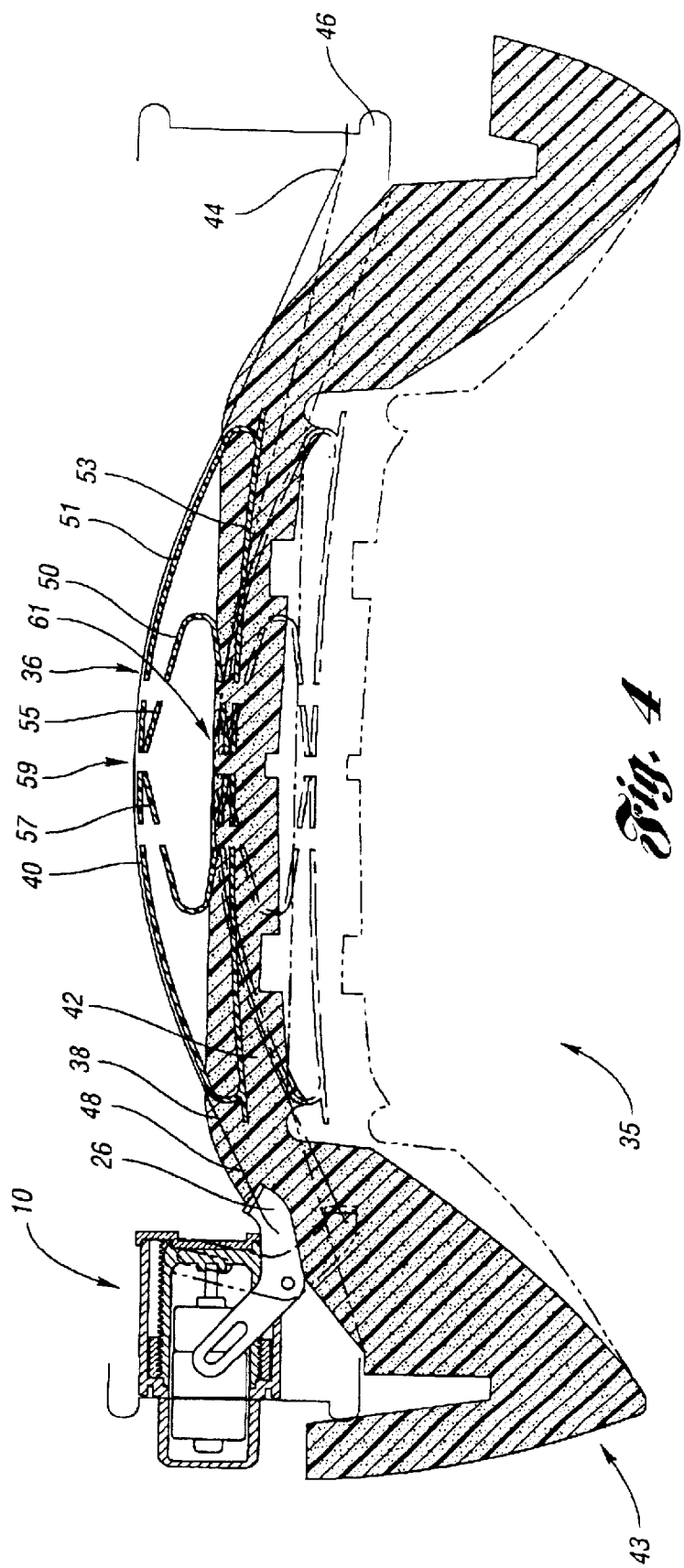
FIG. 4 shows a horizontal cross-sectional view of the lumbar support mechanism of the present invention, with an adjusted position shown in phantom.
Figure 8:
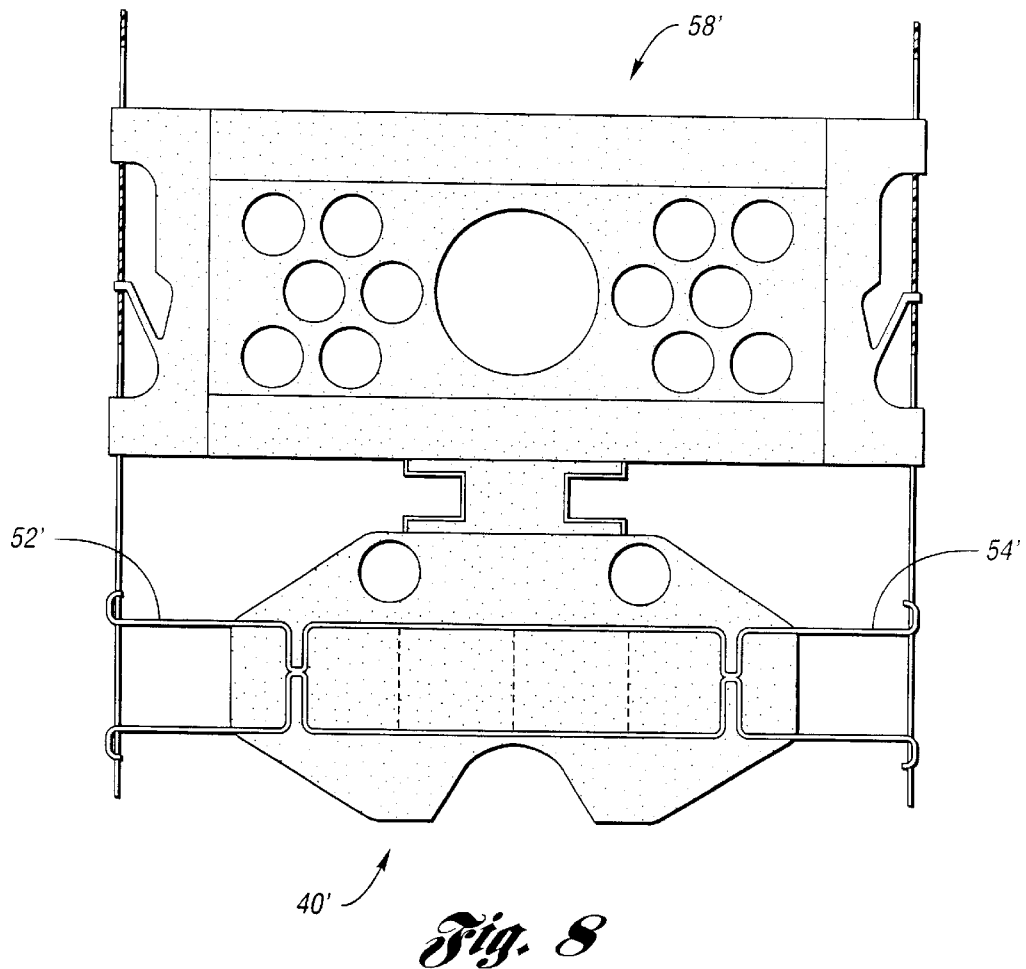
FIG. 8 shows a plan view of a lumbar support mechanism in accordance with a slightly modified alternative embodiment of the invention.
Figure 9:
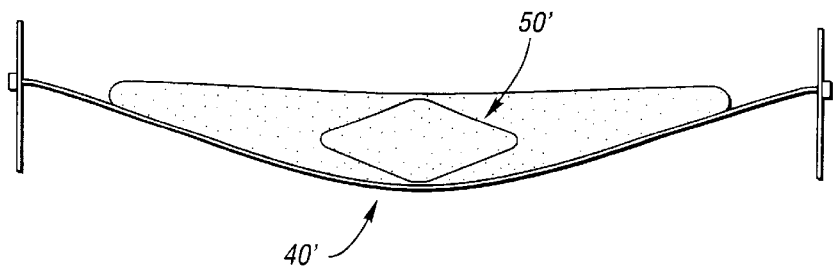
FIG. 9 shows a cross-sectional view taken through FIG. 8.
Figure 10:
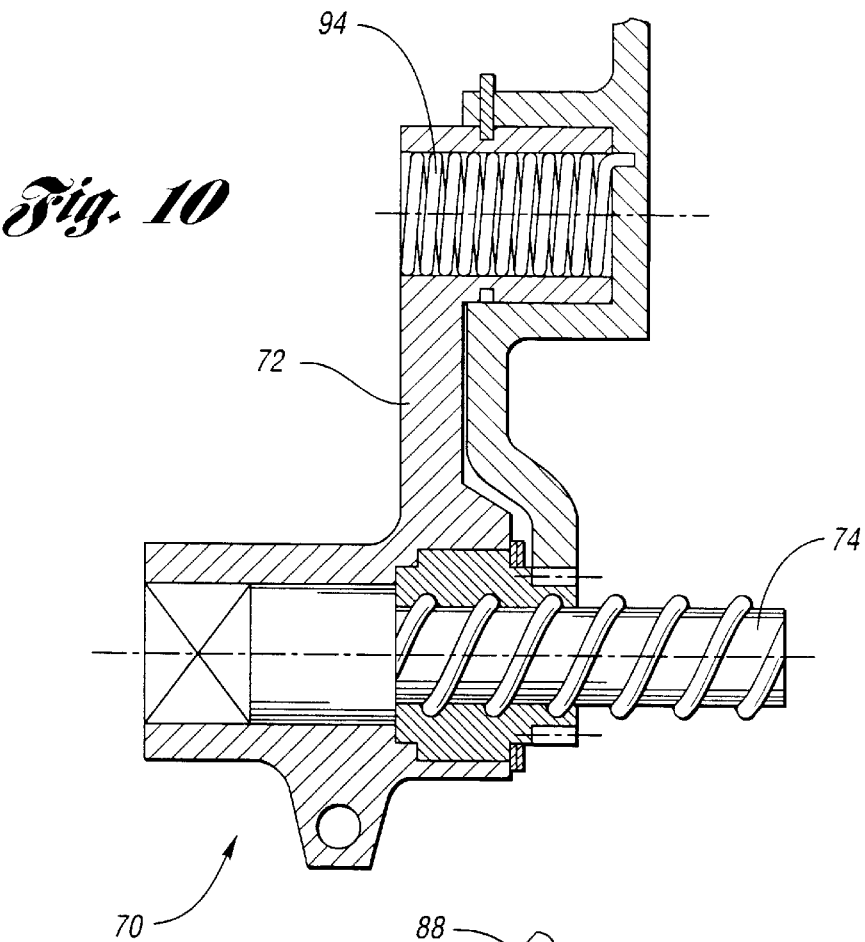
FIG. 10 shows a longitudinal cross-sectional view of a manual lumbar adjustment mechanism in accordance with a further embodiment of the invention.
Figure 11:
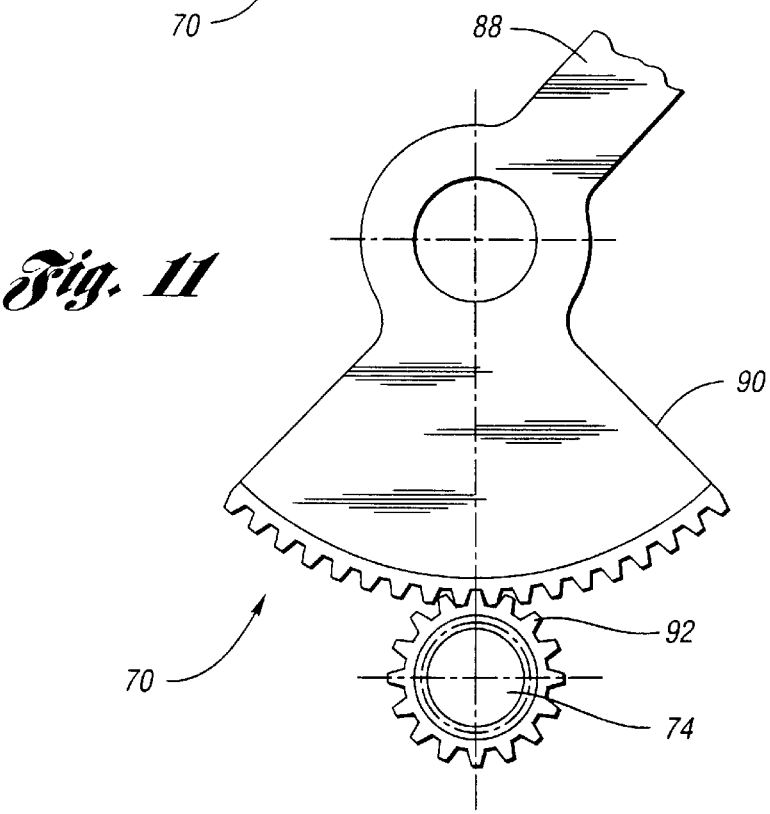
FIG. 11 shows a side view of the manual lumbar mechanism of FIG. 10.
Figure 12:
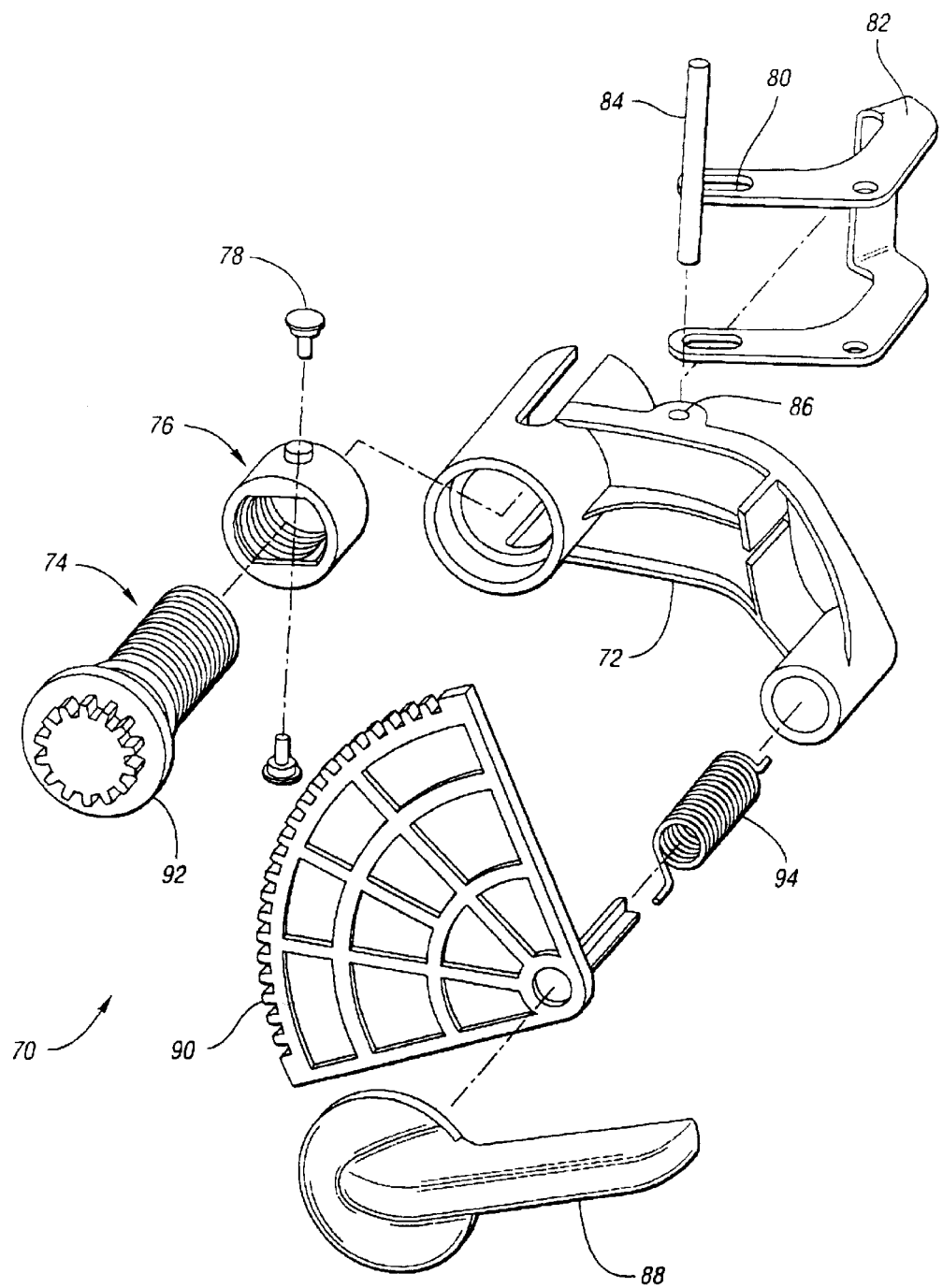
FIG. 12 shows an exploded perspective view of the manual lumbar mechanism of FIG. 10.
Figure 13:
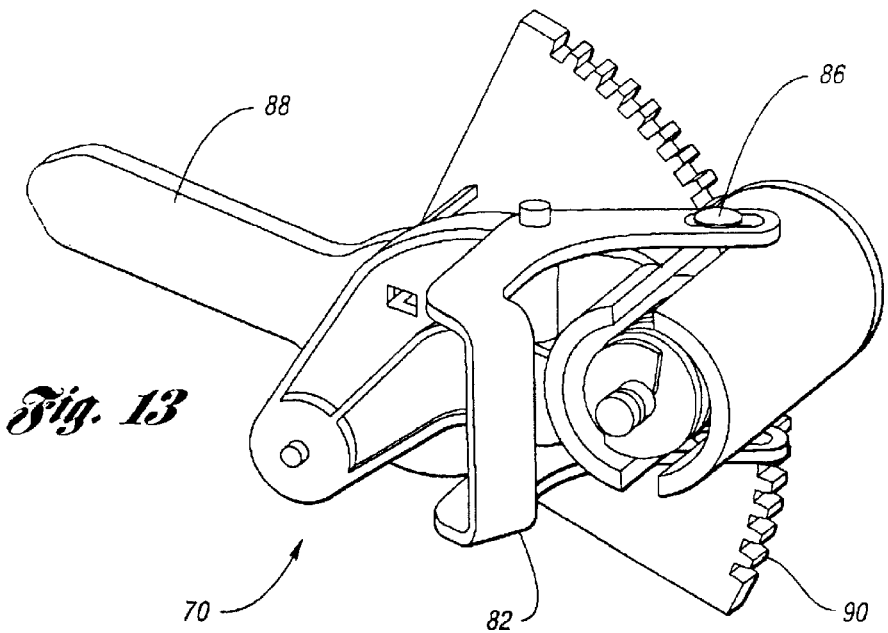
FIG. 13 shows a perspective, assembled view of the lumbar mechanism of FIG. 12.
Figure 14:
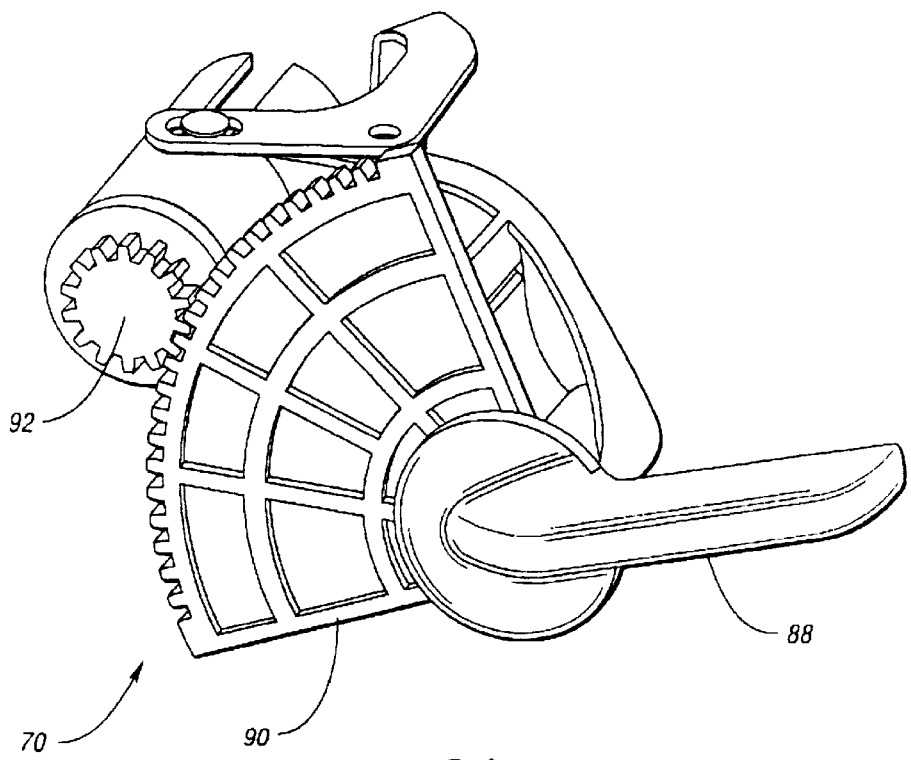
FIG. 14 shows a reverse perspective view of the lumbar mechanism of FIG. 13.

FIG. 4 shows the lumbar drive mechanism 10 of FIGS. 1–3 implemented on a vehicle seat assembly 35 for adjusting a lumbar support device 36 in accordance with a preferred embodiment of the invention. The lumbar support device 36 is shown in various views in FIGS. 4–9, with FIGS. 8 and 9 illustrating a slightly modified alternative embodiment. The lumbar support device 36 includes an adjustable cable 38 which presses a plastic support structure 40 against the foam 42 on the backside of the squab 43 for lumbar adjustment. A first end 44 of the cable 38 is fixed to the back frame 46, and a second end 48 of the cable 38 is connected to the pivoting brace 26 of the lumbar drive mechanism 10.

When the drive mechanism 10 is actuated from the position shown in solid lines in FIG. 4 to the position shown in phantom lines in FIG. 4, the cable 38 is pulled tight against the plastic support structure 40 to force the plastic support structure 40 and the foam 42 forward toward the occupant to support the lumbar region of the seat occupant's back.

The plastic support structure 40 is provided with a Rhomboid-like shape in plan view having an integral spring component 50 to facilitate compression and expansion of the plastic support structure 40. As shown in FIG. 4, the spring structure 50 is formed between opposing outer walls 51,53 which intersect with inner walls 55,57 to form generally X-shaped configurations 59,61 when viewed in horizontal cross-section. In other words, the outer walls 51,53 form a large, generally oval shape in horizontal cross-section, and the inner walls 55,57 form a smaller, generally oval shape in horizontal cross-section, with side walls of the oval shapes intersecting at the X-shape locations 59,61 to form the integral spring structure. FIG. 9 shows slightly modified oval-like shapes for the plastic structure 40', including the spring structure 50'.

These spring structures provide even pressure distribution across the foam 42, enhance lumbar cushioning, and provide protection from rear impact and whiplash by enhancing occupant retention in a rear impact (i.e., as in the "catcher's mitt" concept used in seat back designs for retaining an occupant against the seat back to prevent the occupant from riding up along the seat back during a rear impact). This added occupant retention is achieved because the occupant may protrude further (i.e. recess further) into the lower part of the seat by compression of the plastic support structure 40 so that the lower part of the seat back actually acts as a catcher's mitt-type configuration to retain the occupant in the seated position against the seat back during a rear impact.

Figure 5:
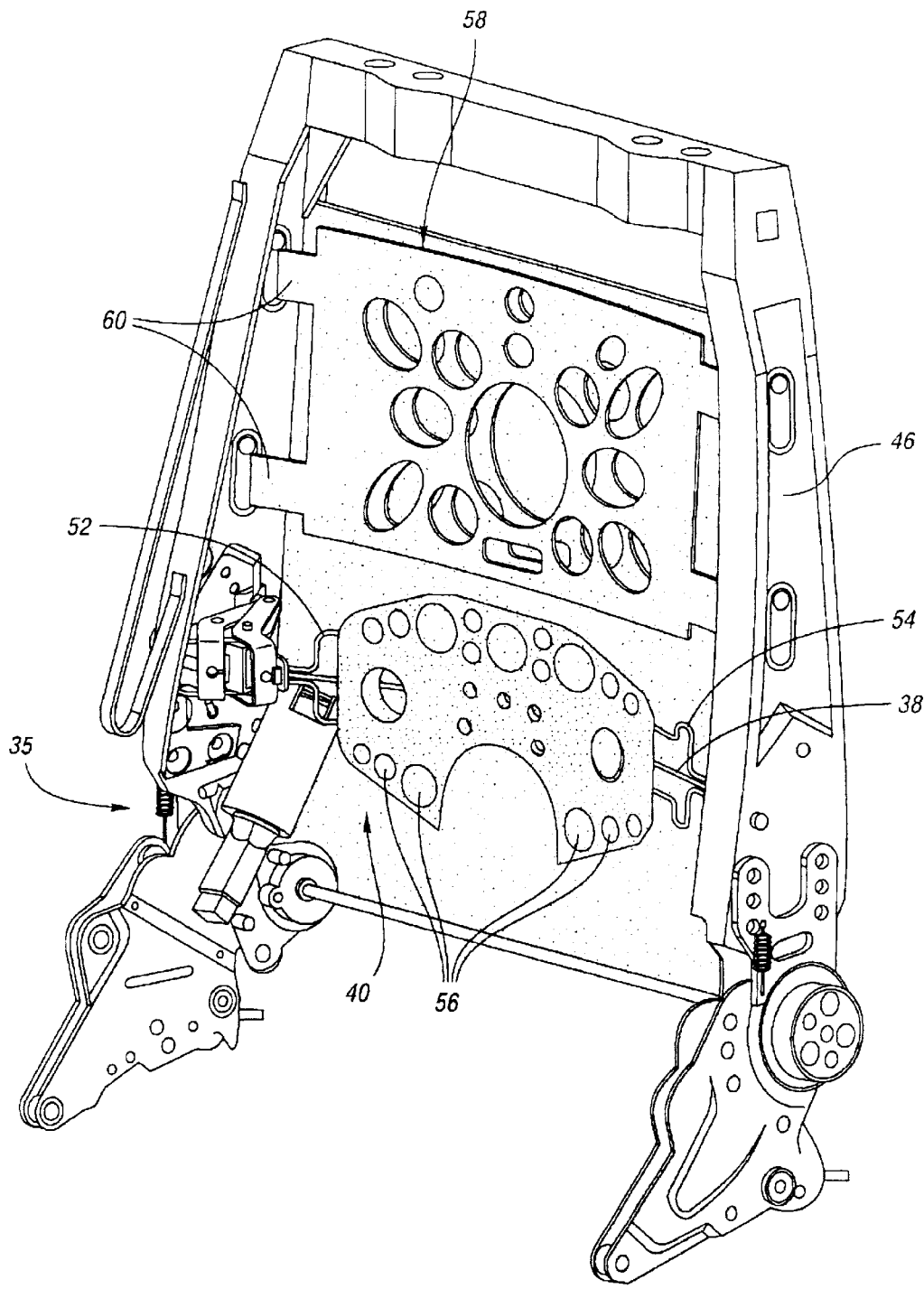
FIG. 5 shows a perspective view of a vehicle seatback incorporating a lumbar support mechanism in accordance with the embodiment of FIG. 4.
Figure 6:
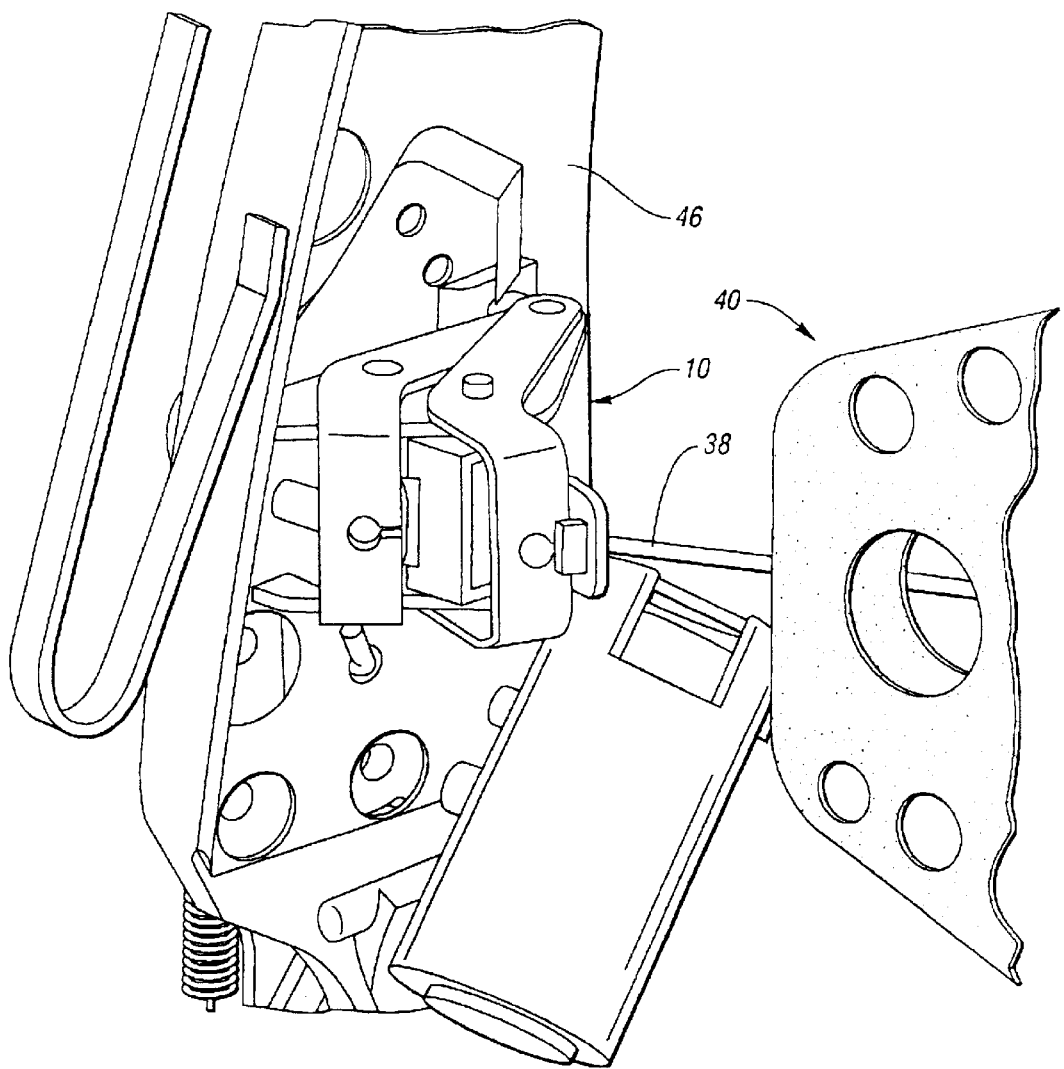
FIG. 6 shows an enlarged perspective view of an actuator and lumbar support member taken from FIG. 5.
Figure 7:
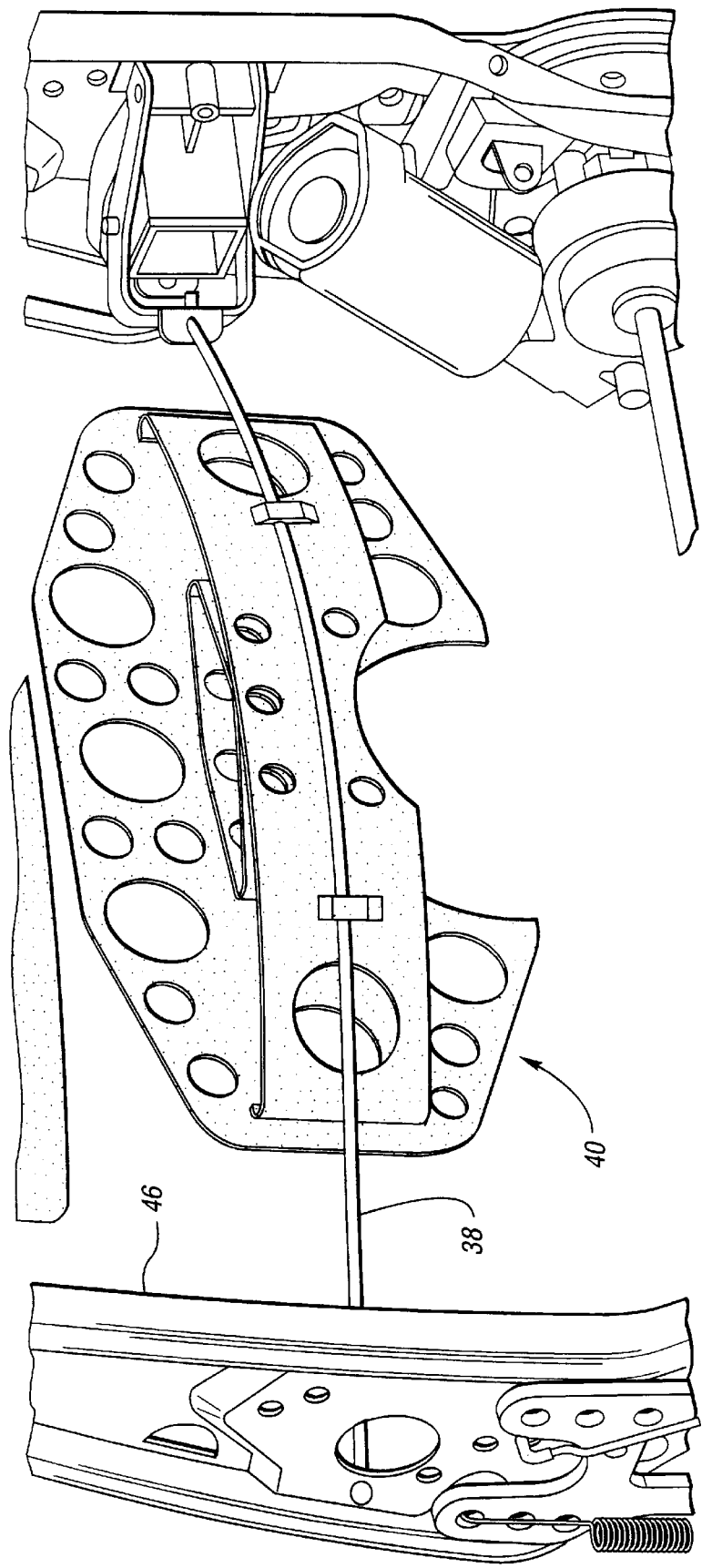
FIG. 7 shows a perspective rear view of a compressible plastic lumbar support positioned in a seatback corresponding with FIG. 5.

Referring to FIGS. 5 and 8, metal wires 52,54 and 52', 54' are provided as extra whiplash protection. These wires 52,54 may be bent during impact by impact force of a body against the plastic support structure 40 for allowing deep penetration of the lower back into the seat for enhanced catcher's mitt effect, and the cold working or bending of the wires 52,54 helps to dissipate energy of the occupant. As shown in FIG. 5, the plastic support structure 40 includes a plurality of holes 56 for reduced weight. Also, an upper plastic support structure 58 is supported by a strap 60 which extends between opposing legs of the seat back frame 46.

Turning to FIGS. 10–14, another aspect of the invention provides a manual lumbar actuation mechanism 70 to replace the power mechanism 10 shown in FIGS. 1–6. As shown in FIGS. 10–14, the manual lumbar actuation mechanism 70 includes a housing 72 which encloses a rotatable screw 74 which drives a nut 76 for actuating a lumbar mechanism. The nut 76 includes a shoulder bolt 78 which engages in a slot 80 of a pivoting brace 82. The brace 82 pivots about a pivot rod 84, which cooperates with a hole 86 in the housing 72. The pivoting brace 82 may be connected to a cable, such as cable 38 shown in FIG. 6, for actuating a lumbar mechanism.

The manual lumbar actuation mechanism also includes a handle 88 which rotatably drives a gear rack 90, which engages the gear 92 on the screw 74 for selectively rotating the screw. A torsional spring 94 is provided for assisting manual rotation of the handle 88 for lumbar actuation. The compressed foam (such as foam 42 shown in FIG. 6) provides an assist force for deactivating the mechanism 70. Once the handle 88 has been adjusted to the desired position, the friction forces between the threads of the screw 74 and the threads of the nut 76 hold the lumbar mechanism in the selected position.

A primary advantage of this structure is that the additional moment arm provided by the lever 88 and the moment arm between the pivot axis and gears of the rack 90 reduce the force required for lumbar adjustment by a seated occupant. Also, the torsional spring 94 reduces the force required for adjustment.

While the best modes for carrying out the invention have been described in detail, those familiar with the art to which this invention relates will recognize various alternative designs and embodiments for practicing the various aspects of the invention without departing from the spirit and scope of the invention as defined in the appended claims.

What is claimed is:

1. A vehicle seat lumbar support adjustment device comprising:
    an actuator operatively connected to a cable which extends across a seatback;
    a compressible plastic support structure positioned between the cable and a cushion layer, and movable toward the cushion layer by tensioning of the cable in order to adjust lumbar support for a seat occupant;
    wherein the plastic support structure forms a generally oval shape positioned within a larger, generally oval shape when viewed in horizontal cross-section.

2. The vehicle seat lumbar support adjustment device of claim 1, wherein said compressible plastic support structure includes an integrally molded spring component positioned between opposing walls of the support structure.

3. The vehicle seat lumbar support adjustment device of claim 2, wherein said integrally molded spring is formed by intersecting walls of the support structure.

4. The vehicle seat lumbar support adjustment device of claim 3, wherein said intersecting walls cross-over each other to form at least one generally X-shaped configuration when viewed in horizontal cross-section.

5. The vehicle seat lumbar support adjustment device of claim 1, wherein said compressible plastic support structure forms one small, generally oval shape positioned within a larger, generally oval shape when viewed in horizontal cross-section, with side walls of said small, generally oval shape intersecting side walls of said larger, generally oval shape to form an integral spring structure.

6. The vehicle seat lumbar support adjustment device of claim 1, wherein said plastic support structure is sufficiently compressible such that upon rear impact at low vehicle speeds, the occupant penetrates deeply into the seatback by compressing the plastic support structure so that the occupant is retained in the seated position.

7. The vehicle seat lumbar support adjustment device of claim 6, further comprising bendable metal wires extending across the seatback, said metal wires being cold-worked during bending upon said penetration of the occupant into the plastic support structure, thereby dissipating energy of the occupant during impact.

8. The vehicle seat lumbar support adjustment device of claim 1, wherein said cable is fixed to a seat backframe at one end and fixed to the actuator at another end.

9. The vehicle seat lumbar support adjustment device of claim 8, wherein said actuator comprises:
 a housing secured to the seat backframe;
 a rotatable drive screw threaded into a movable nut, said nut being engaged with a pivotable brace which is attached to the cable; and
 a drive motor positioned within the rotatable drive screw for rotatably driving the drive screw to move the movable nut and adjust the cable.

10. The vehicle seat lumbar support adjustment device of claim 1, wherein tensioning of said cable causes said cable to press against said compressible plastic support structure, thereby moving said compressible plastic support structure toward said cushion layer.

11. The vehicle seat lumbar support adjustment device of claim 1, wherein said plastic support structure includes opposing outer walls, and a spring component positioned between said outer walls.

12. The vehicle seat lumbar support adjustment device of claim 11, wherein said opposing outer walls form a generally oval shape when viewed in horizontal cross-section.

13. A vehicle seat occupant protection system, comprising:
 a compressible plastic support structure positioned behind a cushion layer in a seatback, said plastic support structure including an integrally molded spring component positioned between opposing walls of the support structure;
 wherein said plastic support structure is sufficiently compressible such that upon rear impact at low vehicle speeds, the occupant penetrates deeply into the seatback by compressing the plastic support structure so that the occupant is retained in the seated position, and wherein the opposing walls form a generally oval shape when viewed in horizontal cross-section.

14. The vehicle seat occupant protection system of claim 13, wherein said integrally molded spring is formed by intersecting walls of the support structure.

15. The vehicle seat occupant protection system of claim 14, wherein said intersecting walls cross-over each other to form at least one generally X-shaped configuration when viewed in horizontal cross-section.

16. The vehicle seat occupant protection system of claim 15, wherein said compressible plastic support structure forms one small, generally oval shape positioned within a larger, generally oval shape when viewed in horizontal cross-section, with side walls of said small, generally oval shape intersecting side walls of said larger, generally oval shape to form an integral spring structure.

17. The vehicle seat occupant protection system of claim 13, wherein said plastic support structure forms a generally oval shape positioned within a larger, generally oval shape when viewed in horizontal cross-section.

* * * * *